Inventor:
Philip G. Hughes,
by [signature]
His Attorney.

Sept. 29, 1953 P. G. HUGHES 2,654,010
THERMAL TIMING APPARATUS
Filed Jan. 18, 1949
2 Sheets-Sheet 2

Inventor:
Philip G. Hughes,
by Claude H. Pratt
His Attorney.

Patented Sept. 29, 1953

2,654,010

UNITED STATES PATENT OFFICE 2,654,010

THERMAL TIMING APPARATUS

Philip G. Hughes, Schenectady, N. Y., assignor to General Electric Company, a corporation of New York Application January 18, 1949, Serial No. 71,504

9 Claims. (Cl. 200—122)

My invention relates to thermal timing apparatus and the like, and more particularly to thermal timing switches. Switches embodying my invention in all its aspects are especially suited to the control and protection of fluid fuel burners and the like.

It is a general object of my invention to provide a new and improved thermal timer, and particularly a thermal timing switch which is inexpensive and readily assembled, as well as durable and reliable in operation.

It is a further object of my invention to provide a new and improved resistance heated thermal timing apparatus compensated for ambient temperature variations and for thermal resistance variations in the heater or heating circuit.

It is still another object of my invention to provide new and improved means for resetting a double acting snap action thermally actuated switch.

It is a particular object of my invention to provide a new and improved dual thermal timing switch for controlling lockout and recycling in a fluid fuel burner control system.

Figure 1:
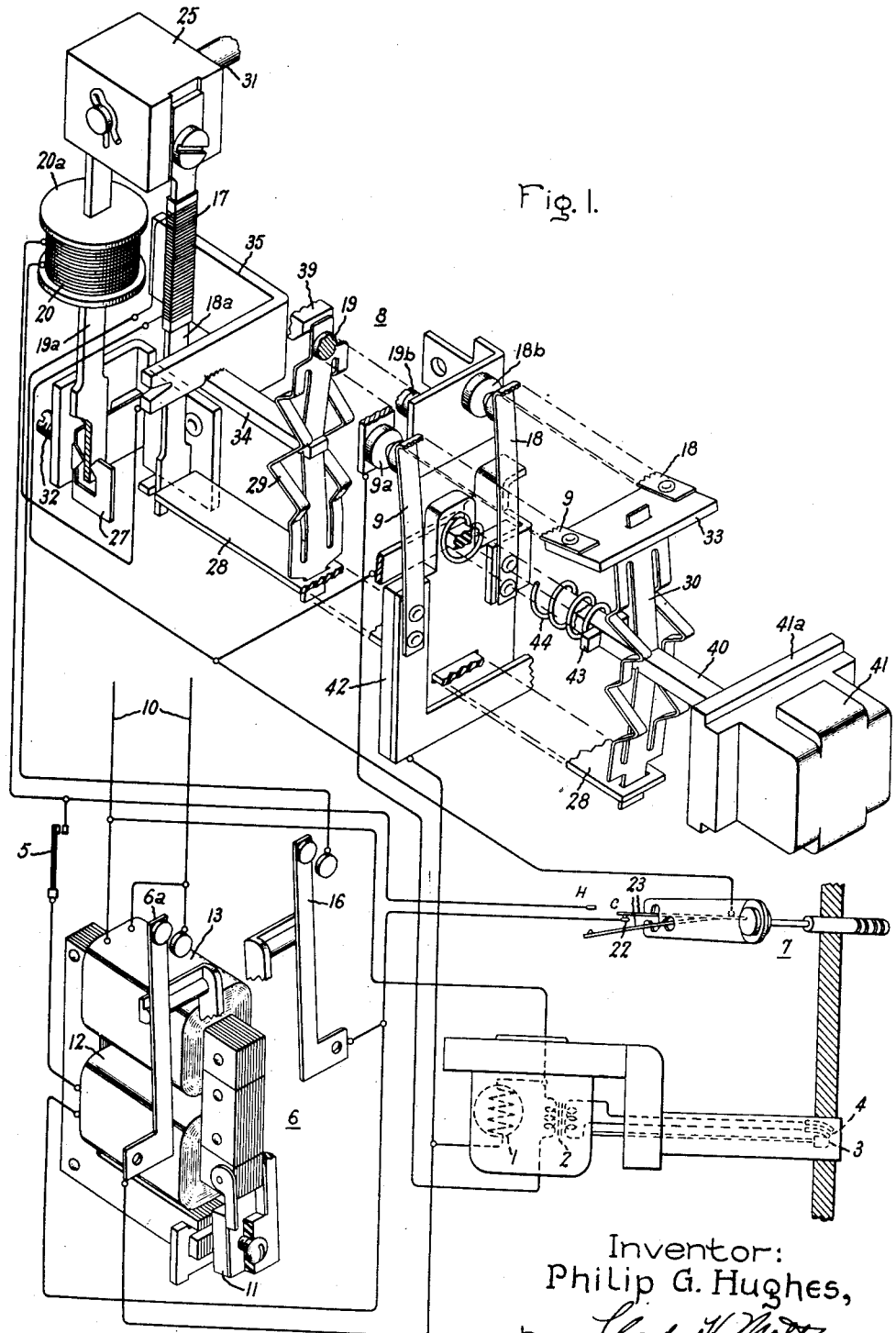
Figures 2, 3:
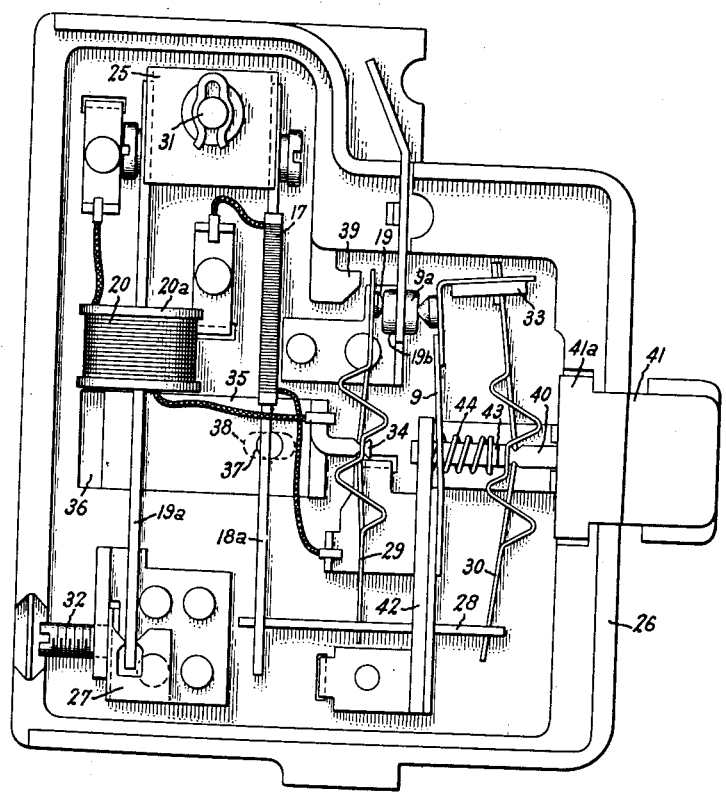

My invention itself will be more fully understood and its various objects and advantages further appreciated by referring now to the following detailed specification taken in conjunction with the accompanying drawings, in which Fig. 1 is a diagrammatic illustration of a burner control apparatus embodying my invention, showing the thermal timing apparatus in exploded perspective view; Fig. 2 is a side elevational view of the thermal timing apparatus of Fig. 1, shown with the parts in assembled relation and Fig. 3 is a schematic circuit diagram of the burner control system shown at Fig. 1 as illustrative of one application of my timer.

Referring now to the drawings, and particularly to Fig. 1, I have illustrated one preferred embodiment of my invention applied to the control of an oil burning apparatus comprising a pump motor 1, an ignition transformer 2, an oil supply nozzle 3 and a pair of ignition electrodes 4. The operation of the burner apparatus, and particularly the operation of the motor 1 and ignition transformer 2 is controlled by a room thermostat 5, a transformer relay 6, a flame detector 7 and a thermal timing apparatus 8. The new and novel features of my improved thermal timing apparatus are best described against the background of an oil burner control system, to which it is typically applicable. For this reason, the control system shown at Figs. 1 and 3 will be first described. This system is described and claimed in a copending application Serial No. 73,293 filed by Jack Witherspoon for Safety Control System for Fluid Fuel Burners, on January 28, 1949, and assigned to the same assignee as the present application, and now Patent 2,604,148 issued July 22, 1952. The flame detector 7 is fully described and claimed in my copending application Serial No. 74,736 filed on February 5, 1949, now Patent 2,512,331 granted June 20, 1950, for Thermal Responsive Switch.

Referring now to Fig. 3, I have shown the motor 1 and ignition transformer 2 connected for energization in parallel circuit relation through normally open contacts 6a of the relay 6. The parallel circuit through the ignition transformer 2 includes a normally closed contact 9 of the thermal timer 8. Through the relay contact 6a, the motor and ignition transformer are connected to a pair of supply conductors 10. The conductors 10 are connected to a source of alternating current supply (not shown) which, for normal home operation, may suitably be of the 110 volt, 60 cycle type.

The transformer relay 6 is preferably of the type more fully described and claimed in the pending applications Serial No. 794,297, filed by Philip G. Hughes on December 29, 1947, now Patent 2,527,220, granted October 24, 1950, and Serial No. 794,298, filed by Philip H. Estes on December 29, 1947, now abandoned, both of which are assigned to the same assignee as the instant application. This relay comprises a three-legged magnetizable core having a movable outer leg or armature 11, a low voltage secondary winding 12 on the center leg and a high voltage primary winding 13 on the upper stationary outer leg. The primary winding 13 of the transformer relay 6 is connected across the supply conductors 10 and the secondary winding 12 is connected to be completed or short circuited through a series circuit including the room thermostat 5 and a pair of thermal timers 14 and 15 (Fig. 3) included in the thermal timing apparatus 8. This series circuit includes the room thermostat 5, a normally open holding contact 16 of the transformer relay 6, an electric heating resistor 17 of the thermal timer 14, a normally closed contact 18 of the thermal timer 14, a normally closed contact 19 of the thermal timer 15 and an electric heating resistor 20 of the thermal timer 15. The thermal timers 14 and 15 are connected in electrically interlocked relation through the hot and cold contacts 21 and 22, respectively, of the flame detector 7, so that the electric heating resistors 17 and 20 are effectively energized only alternatively. More particularly, the flame detector 7 is provided with a movable contact 23 arranged, when in engagement with the cold contact 22, to shunt the heating resistor 17 and the relay holding contact 16. The flame detector contact 23, when in engagement with the hot contact 21, provides a shunt circuit around the heating resistor 20 and the normally closed thermal timer contacts 18 and 19. The thermal timer 14 is connected to actuate also the normally closed ignition transformer contact 9.

In the foregoing arrangement illustrated at Fig. 3, the thermal timer 15 serves as a lockout timer, in that opening of its normally closed contact 19 effects deenergization of the burner motor 1 and ignition transformer 2. The thermal timer 14 serves as a recycling and ignition timer, in that its contact 9 controls the ignition shutoff and its contact 18 controls the scavenging time, or delay interval, between flame failure and reinitiation of burner operation. To facilitate this operation, the heating time of the flame detector 7 is less than the heating time of the thermal lockout timer 15, and the cooling time of the flame detector 7 is less than the cooling time of the thermal recycling timer 14. Moreover, the resistance of the electric heating resistors 17 and 20 is such that when both these resistors are in series in the circuit of the relay winding 12 insufficient current flows in the winding to pick up the relay, but sufficient current is carried through the heating resistors 17 and 20 in series to hold the relay armature 11 in its attracted position, if previously picked up. It will of course be understood that, within the scope of my invention, the circuit may be so connected that the heating resistors are never energized in series circuit relation.

The operation of the control system shown at Fig. 3 is as follows: Starting with the apparatus in its fully deenergized position, as shown, let it be assumed that the room thermostat 5 closes in response to a call for heat. Upon closure of the room thermostat 5, the normally open secondary winding 12 of the transformer relay 6 is completed through the room thermostat 5, the lockout heating resistor 20, the normally closed lockout contact 19, the normally closed recycling contact 18, and the normally closed cold contacts 22, 23 of the flame detector 7. Upon completion of this circuit for secondary winding 12, the relay armature 11 is attracted and closes the contacts 6a and 16. Closure of the contact 6a completes an energizing circuit for the motor 1 and the primary winding of the ignition transformer 2, the ignition transformer circuit including the normally closed thermal timer contact 9. Thus, the oil burner is set into operation. Closure of the relay contact 16 completes a holding circuit for the relay coil 12 in anticipation of opening of the flame detector cold contacts, 22, 23.

If the oil is properly ignited, the resulting flame heats the flame detector 7 and the movable contact 23 leaves the cold contact 22. Prior to such flame detector contact separation, the lockout heater 20 was fully energized, so that if no flame had occurred, the lockout contact 19 would have timed open after a predetermined interval, thereby to open the circuit of the relay winding 12 and deenergize the burner. Under normal starting operation, however, as soon as the cold contacts 22, 23 of the flame detector are separated, the heating resistor 17 is thrown in series circuit relation with the heating resistor 20 through the holding contact 16, thereby to reduce the current in the circuit of the relay winding 12. This reduced current is insufficient to pick up the relay armature 11, but is sufficient to hold it in attracted position. The armature 11 is thus held attracted during the flame detector transfer interval when both heating resistors 17 and 20 are in series. The reduced current in the series circuit through the winding 12 and the heaters 17 and 20 during this transfer interval is also insufficient to appreciably heat the thermal timers 14 and 15, so that progress of the thermal timer 15 toward the lockout position is arrested as soon as the flame detector cold contacts 22, 23 are separated.

If flame continues in the burner uninterrupted, the flame detector movable contact 23 arrives, after a brief interval, at a position of contact engagement with the flame detector hot contact 21. In this position, a shunt circuit is provided through the "hot" contacts 21, 23 around the series connected thermal timer contacts 18 and 19 and the resistance heater 20. The lockout heater 20 being thus short circuited, begins to cool, and the recycling and ignition timer heater 17, being now fully energized by short circuiting of the heater 20, heats up to time its contacts 9 and 18 open. When the contacts 9 and 18 are opened after a predetermined delay interval, the ignition transformer 2 is deenergized by opening of the contact 9. Opening of the contact 18 has no immediate effect, because this contact is in a series circuit which is presently short circuited through the hot contact 21 of the flame detector 7.

If the burner shuts down normally due to opening of the room thermostat 5, the circuit of the relay winding 12 is simply opened at the room thermostat 5, and the relay dropped out to shut down the burner. If, however, flame failure should occur for any reason before the room thermostat 5 opens, the circuit of the relay winding 12 is opened by separation of the flame detector contacts 21, 23. Under conditions of flame outage, whether it be due to normal shutdown by the room thermostat or to flame failure or other cause, the flame detector movable contact 23 responds relatively rapidly by leaving the hot contact 21 and engaging the cold contact 22.

If flame failure is due to some cause other than normal shutdown by the room thermostat 5, so that the room thermostat is still closed, reengagement of the flame detector cold contacts 22 and 23 will not immediately restart the burner. The necessary delay interval between flame failure and recycling, which interval is allowed for scavenging of combustible gases from the furnace chamber, is controlled not by the flame detector 7, but by the slower cooling recycling timer 14. As previously stated, the cooling time of the thermal timer 14 is longer than that of the flame detector. Moreover, the cooling time of the timer 14 is substantially independent of the condititons under which flame failure occur, and therefore, ensures a substantially constant predetermined scavenging time. It will be evident that, if flame failure occurs with the room thermostat 5 closed, recycling is initiated as soon as the thermal timer 14 recloses its contact 18 after the cooling interval.

Referring now more particularly to Figs. 1 and 2, I have illustrated in detail a preferred form of thermal timer structure embodying my invention. In this timer, the lockout and recycling timers 15 and 14, respectively, are mechanically interlinked to provide ambient temperature compensation, as well as compensation of the timer for thermal resistance variations in the heating circuit and protective interlocking of the timer reset mechanism.

From Figs. 1 and 2, it is evident that the combined recycling and lockout timer 8 comprises a pair of elongated thermally deformable bimetallic strips 18a and 19a, each fixed at one end to a pivotally mounted movable supporting block 25 and extending outwardly therefrom in parallel spaced relation. As illustrated, the bimetal strips 18a and 19a are each of the same combination of metals or alloys and have substantially the same cross section, but are of different lengths for reasons which are pointed out hereinafter. The block 25 is rotatably mounted on a base 26, and the extending end of the bimetallic strip 19a is held fixed relative to the base by means of an adjustable stop 27. The free end of the bimetallic strip 18a is linked by a flat strip of insulating material 28 to a pair of snap acting overcenter mechanisms 29 and 30.

Referring more particularly to Fig. 2, the dual thermal timer 8 is mounted in a base or housing 26, preferably formed of a suitable moulded plastic insulating material, open at one side and provided with the necessary abutments, apertures and recesses to accommodate the various parts of the timer. Within the casing 26, the movable supporting block 25 is rotatably mounted upon a pivot pin 31 projecting outwardly from the integral side wall of the casing. The bimetallic strips 18a and 19a are mounted at their upper ends in cantilever fashion on opposite sides of the supporting block 25 and depend therefrom in substantially parallel spaced relation. The bimetallic strips are so disposed on the block 25 that, if the block were held stationary and both strips heated, their free ends would move angularly in the same direction about the pivot pin 31 and block 25. That is, the bimetallic strips 18a and 19a tend to maintain parallelism when equally heated. However, the depending or free end of the bimetallic strip 19a is unable to move with respect to the casing 26 because it is held fixed in the adjustable stop 27. The stop 27 is arranged to be moved slightly with respect to the casing 26 by a set screw 32.

The overcenter switch mechanisms or members 29 and 30 are each of the integral spring plate type and each comprises a spring plate slotted to provide a pair of outer tension members and a pair of inner aligned compression members, the abutting ends of the compression members pivotally engaging a fixed or normally fixed supporting member. In the particular form of the switches herein shown, the outer tension strips of each switch member 29 and 30 are crimped to form tension springs which bias the central pivoted compression members to one side or the other of a dead center position. The upper end of the overcenter switch member 29 carries the lockout contact 19, and the upper end of the overcenter switch member 30 is connected by an insulating link 33 to a pair of cantilever spring contact arms 9 and 18 which constitute the ignition and recycling contacts, respectively. The lower movable ends of the snap action switch members 29 and 30 are each connected by the actuating link 28 to the depending free end of the bimetallic strip 18a. Snap action switch members of this type are claimed in Patent 2,429,813, issued to George M. Hausler on October 29, 1947.

The overcenter snap action switch member 29 is pivotally mounted at its center upon stationary but adjustable support 34. The pivotal support 34 is formed as an ear turned out from the projecting arm of an L-shaped mounting bracket 35. The mounting bracket 35 is positioned with one arm of the L lying in a rectangular recess 36 in the integral side wall of the casing 26. The bracket 35 is fixed in position by a bolt 37, and is adjustable within the range permitted by an elongated hole or slot 38 in the casing side wall through which the bolt 37 passes. The contact carrying end of the snap action switch member 29 stops in one direction of movement against a fixed contact 19b and in the other direction of movement against an abutment 39 formed integrally with the casing 26.

The snap action switch member 30 is mounted at its center upon the slidable shank 40 of a reset button 41 which projects through an aperture in the front wall of the casing 26. The head of the reset button 41 is slidably mounted in the front wall of the casing 26, and the inner end of the shank 40 is slidably mounted in an aperture formed at the upper end of an internal insulating support 42. The support or bracket 42 is fixed on the side wall of the casing 26 in substantially parallel spaced relation with the front casing wall. The fixed bracket 42 serves also as a support for the cantilever contact springs 9 and 18. The reset button shank 40 is provided intermediate its ends with a pair of oppositely projecting shoulders 43, and a helical compression spring 44 encircling the shank 40 is disposed between the shoulders 43 and the supporting bracket 42. The spring 44 biases the reset button 40, 41 to a normal position in which a shoulder 41a abuts against the front casing wall. The reset button shank 40 thus serves as a normally stationary support for the snap action switch member 30. The upper end of the switch member 30 is stopped in one direction of movement by engagement of the contact springs 9 and 18 with a pair of cooperating stationary contacts 9a and 18b, respectively, and in the other direction of movement by engagement of the insulating link 33 with the front wall of the casing 26.

The lockout heater 20 is mounted on the bimetallic strip 19a intermediate its ends, and is preferably arranged for relatively slow thermal response. In the form of the invention illustrated, the lockout heater 20 is of large diameter relative to the cross sectional area of the bimetallic strip 19a, and is concentrated over a small length of the strip. Preferably, the heater 20 is wound upon a sleeve 20a formed of a natural or artificial rubber having relatively poor thermal conductivity. The recycling heater 17 is mounted upon the bimetallic strip 18a intermediate its ends and is preferably arranged for a relatively quick thermal response. To this end, the recycling heater 17 is wound in relatively close thermal contact with the bimetallic strip 18a, and is distributed along a considerable portion of the length of the strip.

In the normal unheated condition of the mechanism shown in the drawing, all the timer contacts 9, 18 and 19 are closed, so that the overcenter biasing forces of the snap action switch members 29 and 30 are in opposition, i. e., tend to move the switch link 28 in the opposite directions. The bimetallic strips 18a and 19a are so disposed on the movable supporting block 25 that, when heated, the strips move, or tend to move, their depending free ends toward the right, as viewed in the drawings.

In operation, when the bimetallic strip 19a is heated, it tends to move its depending free end toward the right. Such movement of the end of the strip 19a is, however, restrained by the stop 27, with the result that the strip 19a effects pivotal movement of the rotatably mounted supporting block 25 in a clockwise direction, as viewed in the drawings. Such clockwise rotation of the supporting block 25 moves the depending free end of the bimetallic strip 18a to the left, as viewed in the drawings. On the other hand, heating of the bimetallic strip 18a causes its free end to move toward the right, thereby to counteract the rotational movement of the supporting block 25. Thus, it will be seen that, with the bimetallic strips 19a and 18a extending outwardly from the pivotally mounted supporting block 25 and arranged to move or tend to move their free ends in the same angular direction with respect to the block when heated, an ambient temperature compensation is effected due to the action of the free strip in counteracting by its movement the deformation of the restrained strip.

The combined thermal timer shown at Fig. 2 is also compensated in its lockout action for resistance variations in the heater circuit due to temperature changes in the lockout heater coil 20 and relay winding 12. Such resistance variations will occur as a result of temperature changes if conductor materials having temperature coefficients of resistance other than zero are used for the heater coil and relay winding, and the materials which are used for these devices usually have positive temperature coefficients of resistance. Thus, a substantially constant predetermined lockout time is provided by the timer independently of the ambient temperature in which the lockout heating resistor 20 and the relay coil 12 are operating. This avoids lengthening of the lockout timing interval upon recycling when the lockout heater and relay coil are operating at relatively high ambient temperatures due to self-heat. For this purpose, the lockout bimetal 19a is made somewhat longer, for example, about four or five per cent longer, than the recycling bimetal 18a. Thus, due to the unequal deformations of the two bimetals, the timer is not exactly compensated or is slightly mismatched for changes in ambient temperature. Such mismatching produces a slight motion of the switch link 28 in the lockout direction upon increase of ambient temperature with no heating current flowing. This slight motion in the lockout direction aids the lockout heater and compensates for the reduced heater current in the lockout heater resulting from increased coil resistance under high ambient temperature conditions. By proper proportioning of the length of the bimetallic elements 18a and 19a, the lockout delay interval may be made substantially the same over a considerable range of ambient temperature. Also, it will be understood that, by changing the degree of mismatching, the device may be compensated for resistance variations in both the lockout heater and the relay coil, or only in the lockout heater alone, depending upon the circuit used and the condition desired.

The normal operation of the thermal timer, shown at Fig. 2, in the system previously described in conjunction with Fig. 3, is as follows: Upon closure of the room thermostat 5, the recycling heater 17 is short circuited and the lockout heater 20 energized. The bimetallic strip 19a is thus heated and deformed and the movable support 25 is rotated clockwise, thereby to move the switch link 28 toward the lockout position (to the left, as viewed in the drawings). This movement, however, is relatively slow due to the thermal characteristics of the lockout heater 20, so that if flame is established at the proper time, the flame detector 7 closes on its hot contact 21 before the lockout switch member 29 is snapped overcenter to open its contacts, thereby to short circuit the lockout heater and fully energize the recycling heater 17. Consequent heating of the recycling bimetal 18a and cooling of the lockout bimetal 19a reverses the motion of the switch link 28, thereby to move the link back toward its normal position and beyond this position (toward the right, as viewed at Fig. 2) to effect overcenter opening operation of the recycling and ignition switch member 30. Upon shutdown of the burner, for any cause, the recycling heater 17 is deenergized and the bimetal 18a allowed to cool. During this cooling interval, the switch actuating link 28 is moved back toward its normal position, thereby to snap the switch member 30 overcenter and reclose the contacts 9 and 18. This reclosure interval of the contacts 9 and 18 upon cooling of the bimetallic strip 18a, determines the recycling time, or scavenging interval, of the burner.

It will, of course, be understood that if, in the foregoing cycle, no flame is established, the flame detector 7 does not transfer its contacts. Under this condition, the recycling heater 17 remains short-circuited, and the lockout heater 20 continues to cause deformation of the bimetal 19a to a limiting lockout position. This action moves the switch link 28 to the left as viewed in the drawings until the lockout contact 19 is snapped open. As more fully explained hereinafter, cooling of the bimetal 19a from this lockout position does not cause automatic reclosure of the contact 19.

As previously noted, when the switch link 28 is in its normal position with both the lockout contact and the recycling contacts closed, the overcenter biasing forces of the snap action switch members 29 and 30 are applied to the switch link 28 in opposition. Consequently, when either one or the other of the switch members 29 or 30 is in its contact opening position, the overcenter biasing forces of both snap action switch members are applied in aiding relation to the switch link 28. In the open position of the switch member 30, these aiding overcenter forces are insufficient to overcome the appreciable return force of the resilient bimetallic member 18a as it is cooled. On the other hand, the normal position of the lockout switch member 29 is much closer to its dead center position than are the corresponding positions of the switch member 30, so that when the lockout switch member is in its contact opening position, the bimetallic strip 18a is only slightly deformed and its return force is insufficient to overcome the combined overcenter biasing forces of the two switch members 29 and 30. This adjustment ensures that the lockout contact 19 will remain open after the thermal timer has cooled following lockout on flame failure. It is to reset the lockout switch member 19 that the reset button 40, 41 is provided.

It will be noted that the reset button 40, 41 does not directly engage either the lockout switch member 29 or the switch link 28, but rather actuates the switch link 28 only through overcenter action of the snap action switch member 30. This is a safety feature which positively ensures opening of the contacts 9 and 18 prior to reclosure or resetting of the lockout contact 19. In resetting operation with the lockout contact 19 open, the reset button 40, 41 is pushed inwardly to move the normally stationary central pivot points of the snap action switch member 30 overcenter with respect to its end. By this movement, the switch member 30 is snapped to its open circuit position, thereby opening its contacts 9 and 18 and reversing its overcenter biasing force applied to the switch link 28. The thus reversed overcenter biasing force of the switch member 30 aids the return force of the bimetallic strip 18a, and together these forces are sufficient to overcome the opening bias of the lockout switch member 29, so that the switch link 28 is moved to the right, as viewed in the drawings, to snap the switch member 29 overcenter and reclose the lockout contact 19. The reset button 40, 41 is then released and returned to its normal position under the influence of the return spring 44. In so returning to its normal position, the reset button effects reclosing operation of the snap action switch member 30.

From the foregoing detailed description, it will now be evident that in the dual thermal timer shown at Fig. 2, it is not essential that the bimetallic strips 18a and 19a extend from the supporting block 25 in parallel spaced relation, but if desired, these bimetallic strips may extend from the block 25 in any desired angular spaced relation. Moreover, it will be evident that the interlocking reset arrangement described above in conjunction with the two snap action switch members 29 and 30, is not limited in its application to an ambient temperature compensated thermal timer, but is equally applicable to any oppositely disposed pair of overcenter switch members actuated by a common actuating member.

The snap action switch mechanism itself is more particularly claimed in my divisional application Serial No. 105,051, filed on March 16, 1950 and entitled "Snap Action Electric Switch Mechanism," and now Patent 2,632,073, issued March 17, 1953.

While I have described and illustrated only a preferred embodiment of my invention by way of example, many modifications will occur to those skilled in the art and I, therefore, wish to have it understood that I intend in the appended claims to cover all such modifications as fall within the true spirit and scope of my invention.

What I claim as new and desire to secure by Letters Patent of the United States is:

1. In a thermal timer, a base, a movable support rotatably mounted upon said base, a pair of elongated thermally deformable members of unequal lengths each mounted at one end upon said support and having a free end extending outwardly therefrom, said deformable members being disposed to deflect when heated in the same angular direction about the axis of said movable support, stop means holding the free end of the longer said deformable member fixed with respect to said base whereby deformation of said longer member effects pivotal movement of said support, and an electric heating resistor having a positive temperature coefficient of resistance disposed in heat conducting relation with said longer deformable member, the difference in the lengths of said deformable members being such that the resulting unequal deformations of the deformable members substantially compensate for changes in the heating of said longer member due to current changes in said heating resistor resulting from temperature produced changes in the resistance thereof.

2. In a thermal timer, a base, a movable support rotatably mounted upon said base, a pair of elongated thermally deformable members of unequal length each mounted at one end upon said support and having a free end extending outwardly therefrom, said deformable members being disposed to deflect when heated in the same angular direction about the axis of said movable support, stop means holding the free end of the longer of said deformable members fixed with respect to said base whereby thermal deflection of said longer member effects pivotal movement of said support and consequent movement of the free end of the other of said deformable members in one direction from a normal position, said other deformable member deflecting when heated to move its free end in the opposite direction, separate electric heating means disposed in heat conducting relation with each of said deformable members, and separate switching means actuated by the free end of said other deformable member upon predetermined movement of said free end from said normal position in each direction, the difference in the lengths of said deformable members being such that the resulting unequal deformations of the deformable members substantially compensate for changes in the heating of said longer member due to current changes in the heating resistor associated therewith resulting from temperature produced changes in the resistance of this heating resistor.

3. In a control apparatus for a fluid fuel burner, a thermal timer comprising a base, a movable support rotatably mounted upon said base, a pair of elongated thermally deformable members of unequal length each mounted at one end upon said support and having a free end extending outwardly therefrom, said deformable members being disposed to deflect when heated in the same angular direction about the axis of said movable support, stop means holding the free end of one of said deformable members fixed with respect to said base whereby thermal deflection of said one member effects pivotal movement of said support and consequent movement of the free end of the other said deformable member in one direction from a predetermined normal position, said other deformable member deflecting when heated to move its free end in the opposite direction, separate electric heating resistors each disposed in heat conducting relation with one of said deformable members, the difference in the lengths of said deformable members being such that the resulting unequal deformations of the deformable members substantially compensate for changes in the heating of said longer member due to current changes in heating resistor associated therewith resulting from temperature produced changes in the resistance of this heating resistor, and separate control means actuated alternatively by the free end of said other deformable member upon predetermined displacement of said end from said normal position in one direction or the other.

4. In a thermal timer, a base, a movable support rotatably mounted upon said base, a pair of elongated thermally deformable members each mounted at one end upon said support and having a free end extending outwardly therefrom, said deformable members being disposed to deflect when heated in the same angular direction about the axis of said movable support, stop means holding the free end of one of said deformable members fixed with respect to said base whereby deformation of said one member effects pivotal movement of said support and consequent movement of the free end of the other of said deformable members in one direction from a normal position, said other deformable member deflecting when heated to move its free end in the opposite direction, separate electric heating means disposed in heat conducting relation with each of said deformable members, and a pair of normally oppositely disposed overcenter switch mechanisms each coupled to the free end of said other deformable member and arranged to be actuated respectively upon predetermined movement of said free end from said normal position in one direction or the other, said normal position of said other deformable member being unequally spaced from the dead center positions of said overcenter mechanisms so that the return force of said other deformable member upon cooling is sufficient to provide automatic reset of only one of said over-center mechanisms, and manually operable means for resetting the other of said overcenter mechanisms.

5. In a thermal timer, a base, a movable support rotatably mounted upon said base, a pair of elongated thermally deformable members each mounted at one end upon said support and having a free end extending outwardly therefrom, said deformable members being disposed to deflect when heated in the same angular direction about the axis of said movable support, stop means holding the free end of one of said deformable members fixed with respect to said base whereby deformation of said one member effects pivotal movement of said support and consequent movement of the free end of the other of said deformable members in one direction from a normal position, said other deformable member deflecting when heated to move its free end in the opposite direction, separate electric heating means disposed in heat conducting relation with each of said deformable members, and a pair of normally oppositely disposed overcenter switch mechanisms each coupled to the free end of said other deformable member and arranged to be actuated respectively upon predetermined movement of said free end from said normal position in one direction or the other, said normal position of said other deformable member being unequally spaced from the dead center positions of said overcenter mechanisms so that the return force of said other deformable member upon cooling is sufficient to provide automatic reset of only one of said overcenter mechanisms, and manually operable means movable independently of said free end of said other deformable member for effecting overcenter movement of said one overcenter mechanism thereby to reset the other said overcenter mechanisms.

6. In a thermal timer, a base, a movable support rotatably mounted upon said base, a pair of elongated thermally deformable members of unequal length each mounted at one end upon said support and having a free end extending outwardly therefrom, said deformable members being disposed to deflect when heated in the same angular direction about the axis of said movable support, stop means holding the free end of the longer of said deformable members fixed with respect to said base whereby thermal deflection of said longer member effects pivotal movement of said support and consequent movement of the free end of the other of said deformable members in one direction from a normal position, said other deformable member deflecting when heated to move its free end in the opposite direction, separate electric heating means disposed in heat conducting relation each with one of said deformable members, a pair of overcenter switch mechanisms normally oppositely disposed and coupled for actuation to said free end of said other deformable member, said switch mechanisms being actuated respectively upon movement of said free end of said other deformable member in one direction or the other and being so disposed that less movement of said free end of said other deformable member from said normal position is required to actuate the overcenter mechanism operable upon heating of said longer deformable member than is required to actuate the other overcenter mechanism, and manually operable means movable independently of said free end of said other deformable member to move said other switch mechanism overcenter thereby to reset both said switch mechanisms.

7. A thermally responsive apparatus including a pivotally mounted support, a pair of elongated thermally deformable members each mounted at one end upon said support and having a free end extending outwardly therefrom, said deformable members being disposed to deflect when heated in the same angular direction about the axis of said movable support, stop means holding the free end of one of said deformable members fixed whereby deformation of said one member effects pivotal movement of said support and consequent movement of the free end of the other of said deformable members in one direction from a normal position, said other deformable member deflecting when heated to move its free end in the opposite direction, and a pair of normally oppositely disposed over center switch mechanisms each coupled to the free end of said other deformable member and arranged to be actuated respectively upon predetermined movement of said free end from said normal position in one direction or the other, said normal position of said other deformable member being unequally spaced in terms of movement of this member from the dead center positions of said overcenter mechanisms so that the return force of said other deformable member upon cooling is sufficient to provide automatic reset of only one of said overcenter mechanisms, and manually operable means for resetting the other of said overcenter mechanisms.

8. A thermally responsive switch apparatus including a pivotally mounted support, a pair of elongated thermally deformable members each having one end rigidly secured to said support and having a free end extending outwardly therefrom, said deformable members being arranged to deflect when heated in the same angular direction about the pivot axis of said support, stop means holding the free end of one of said deformable members fixed whereby deformation of said one member effects pivotal movement of said support and consequent movement of the free end of the other of said deformable members in one direction from a normal position, said other deformable member deflecting when heated to move its free end in the opposite direction, and a pair of overcenter switch mechanisms coupled to the free end of said other deformable member for actuation respectively upon movement of said other free end from said normal position in one direction or the other, said switch mechanisms being so disposed that less movement of said other free end is required to actuate one mechanism than the other mechanism, and manually operable means movable independently of said other free end to move said other switch mechanism overcenter thereby to reset both said switch mechanisms.

9. A thermally responsive switch apparatus including a pivotally mounted support, a pair of elongated thermally deformable members each having one end rigidly secured to said support and having a free end extending outwardly therefrom, said deformable members being arranged to deflect when heated in the same angular direction about the pivot axis of said support, stop means holding the free end of one of said deformable members fixed whereby deformation of said one member effects pivotal movement of said support and consequent movement of the free end of the other of said deformable members in one direction from a normal position, said other deformable member deflecting when heated to move its free end in the opposite direction, and a pair of overcenter switch mechanisms coupled to the free end of said other deformable member for actuation respectively upon movement of said other free end from said normal position in one direction or the other, and means for actuating one of said switches overcenter from its normal position independently of movement of said other free end.

PHILIP G. HUGHES.

References Cited in the file of this patent

UNITED STATES PATENTS

| Number | Name | Date |
|---|---|---|
| 2,159,342 | Persons | May 23, 1939 |
| 2,181,606 | Parks | Nov. 28, 1939 |
| 2,302,440 | Hardy | Nov. 17, 1942 |
| 2,318,012 | Pond | May 4, 1943 |
| 2,343,060 | Horning | Feb. 29, 1944 |
| 2,348,516 | Bazley | May 9, 1944 |
| 2,353,350 | Millerwise | July 11, 1944 |
| 2,409,112 | Dillman | Oct. 8, 1946 |
| 2,446,307 | Shaw | Aug. 3, 1948 |
| 2,446,831 | Hottenroth, Jr. | Aug. 10, 1948 |
| 2,465,119 | Resek et al. | Mar. 22, 1949 |
| 2,582,419 | Dillmann et al. | Jan. 15, 1952 |